United States Patent [19]

Blakeslee

[11] 3,998,489

[45] Dec. 21, 1976

[54] CAB FOR A HARVESTING MACHINE

[75] Inventor: Edward A. Blakeslee, New Holland, Pa.

[73] Assignee: Sperry Rand Corporation, New Holland, Pa.

[22] Filed: Sept. 11, 1975

[21] Appl. No.: 612,395

Related U.S. Application Data

[63] Continuation of Ser. No. 430,439, Jan. 3, 1974, abandoned.

[52] U.S. Cl. .......................... 296/28 CV; 296/84 A
[51] Int. Cl.² .......................................... B60J 1/02
[58] Field of Search .......... 296/28 C, 28 CV, 84 R, 296/84 A, 84 D

[56] References Cited

UNITED STATES PATENTS

| | | | |
|---|---|---|---|
| 1,631,046 | 5/1927 | McCullough | 296/28 CV |
| 3,278,222 | 10/1966 | Mullet | 296/28 C |
| 3,397,008 | 8/1968 | Timmerman | 296/28 C |
| 3,709,553 | 1/1973 | Churchill | 296/28 C |

Primary Examiner—Robert R. Song
Assistant Examiner—John A. Carroll
Attorney, Agent, or Firm—John R. Flanagan; Frank A. Seemar; Michael R. Swartz

[57] ABSTRACT

A cab for a harvesting machine having transparent members mounted between the floor and roof portions of the cab. The transparent members maintain their relative positions with respect to each other through the use of supporting means which are operably associated with the transparent members and the floor or roof of the cab. These supporting means are so positioned to securely and rigidly maintain the transparent members in their respective positions without obstructing the view of the operator through the transparent members.

5 Claims, 8 Drawing Figures

CAB FOR A HARVESTING MACHINE

This is a continuation of copending application Ser. No. 430,439, filed Jan. 3, 1974, and now abandoned.

BACKGROUND OF THE INVENTION

This invention relates to harvesting machines and more particularly to cabs used in self-propelled harvesting machines.

In self-propelled harvesting machines, the operator's platform is generally enclosed so as to provide a more comfortable environment in which the operator can work. Throughout the years it has been found that the greater amount of visibility the operator has while in the cab the easier it will be for him to operate the harvester. To obtain the greatest amount of visibility without sacrificing the structural integrity of the cab, manufacturers have placed rigid metal supports wherever portions of glass abut each other so as to maintain the abutting surfaces in contact with each other as well as providing suitable structural strength. These supports obstruct the view of an operator when he peripherally views the front of the header. The obstructions encountered are particularly pronounced with cabs centrally mounted on the frame. These centered platform cabs are placed directly above the header and project forwardly so that the line of vision to the header is sharply downward and to the sides.

When operating a harvester the entire width and the overall operation of the header should be easily viewed by the operator in either a standing or a seated position. It is extremely important for an operator to observe the crops as they are being cut and fed into the header so that the mechanism is not clogged, or that the operator has not deviated from his desired course, either of which would decrease the efficiency of the harvesting machine.

The purpose of this invention is to provide a cab for use with harvesting machines which will eliminate any obstructions the operator may encounter when viewing the header.

OBJECTS AND SUMMARY OF THE INVENTION

The principal object of this invention is to provide a cab for a harvesting machine which will provide a clear and unobstructed view of the header of a harvesting machine.

Another object of the invention is to provide a cab for a harvesting machine which will provide the operator with a clear and unobstructed view of the header while maintaining the structural integrity of the cab.

Another object of this invention is to provide a cab for a harvesting machine which provides a clear and unobstructed view of the header by eliminating the supports previously used to maintain the abutting edges of the transparent members in juxtaposition to each other.

In summary, this invention is directed to a cab for a harvesting machine having transparent members mounted between the floor and roof portions of the cab. Supporting means operably associated with the transparent members and the floor or roof of the cab, are provided to securely and rigidly maintain the transparent members in their respective positions with respect to each other.

These and other objects and advantages of this invention will be apparent to those skilled in the art after a consideration of the following detailed description, taken in conjunction with the accompanying drawings in which the preferred form of this invention is illustrated.

DETAILED DESCRIPTION OF THE PREFERRED EMBODIMENT

In the following description, right-hand and left-hand reference is determined by standing to the rear of the harvesting machine and facing the direction of travel.

Figure 1:
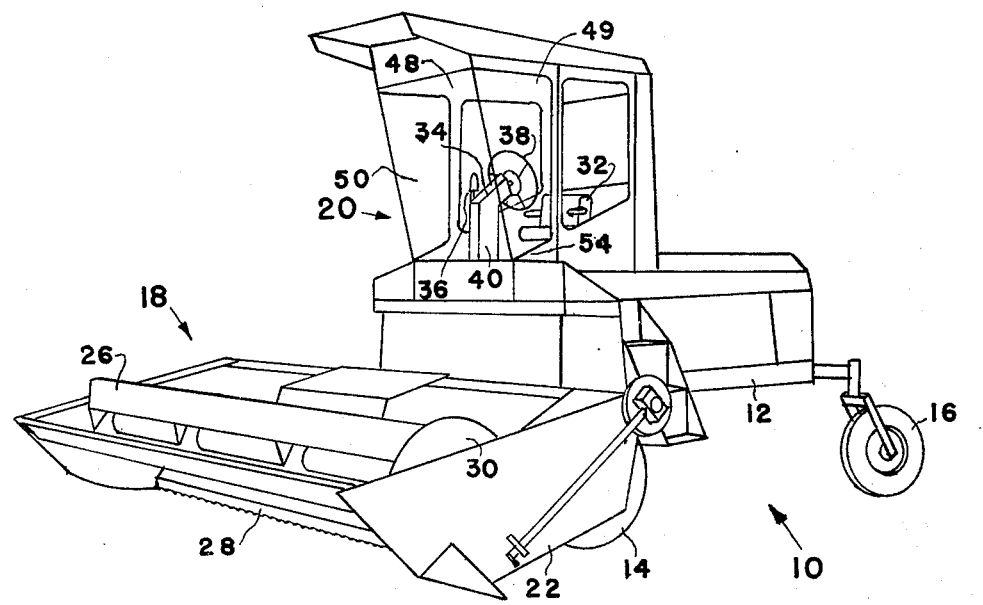
FIG. 1 is a perspective view of a harvesting machine.

Referring particularly to FIG. 1, a perspective of the left side of a harvesting machine, in this particular case a windrower, 10 is shown. Harvesting machine 10 is mounted on main frame 12 which is supported for movement over the ground by pairs of wheels 14 and 16, only one wheel of each pair being shown. A header 18 is mounted to the front of frame 12 to cut and gather the crop material to be harvested. This header may be of a conventional type having a main frame 22, reel 26 mounted to direct the crop material towards the machine and a sickle 28 extending across the frame of the header. A consolidating auger 30 is rotatably mounted on header frame 22 for conveying the cut crop material from one end of the header towards the center to facilitate any further operations which may be performed on the material. Mounted directly to the rear of the header on the main frame of the harvester is the operator's platform 20. This platform is centrally positioned on the frame to give the harvester operator a clear view of the header during the harvesting operation.

Mounted on operator's platform 20 is an adjustable seat 32, a console 34 and various meters and control levers 36. A steering wheel 38 is mounted on steering shaft 40 and is centrally located on the operator's platform. The steering operation is accomplished by turning the steering wheel 38 thereby activating a hydraulic system, (not shown) which controls the positioning of rear wheels 16.

Figure 5:
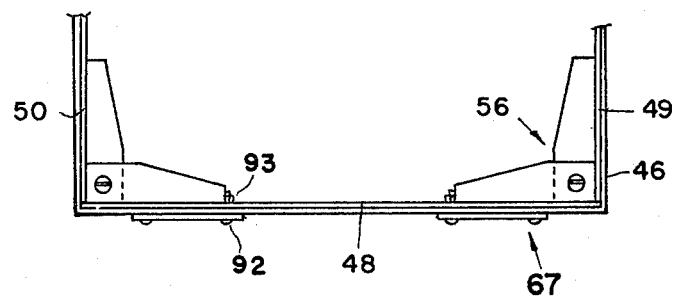
FIG. 5 is a view taken along line 5—5 of FIG. 3.
Figure 6:
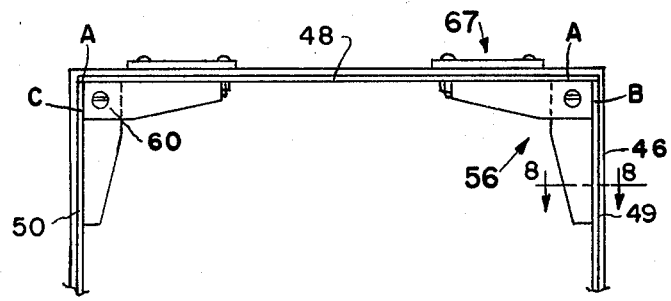
FIG. 6 is a view taken along line 6—6 of FIG. 3.
Figure 8:
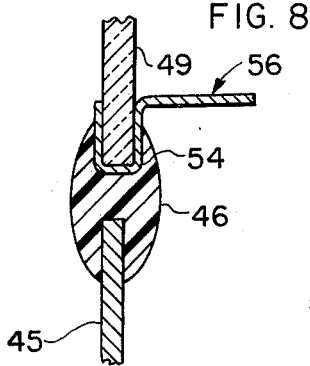
FIG. 8 is a sectional view as seen along line 8—8 of FIG. 6.

The operator's platform also comprises a floor 42 rigidly mounted to the operator's platform of the harvester. Extending upwardly along the front, and portions of the sides of the floor are wall sections 44 and 45 respectively. These wall sections are rigidly secured to the floor and extend upwardly from the floor. Placed on the top most portions of these wall sections is molding 46, as illustrated in FIGS. 5, 6 and 8. This molding has one end which extends over the wall sections and another end which is formed to receive transparent members 48, 49 and 50. Transparent member 48 comprises the front or windshield member of the cab. Mounted to either side of member 48, on sidewall sections 45, are transparent members 49 and 50 respectively.

The adjacent edges A, B and C of transparent members 48, 49 and 50 are bonded together by silicon based adhesive. This adhesive was selected because of its resilient properties which creates a flexible, rather than rigid connection between edges A (of member 48), B and C.

Figure 7:
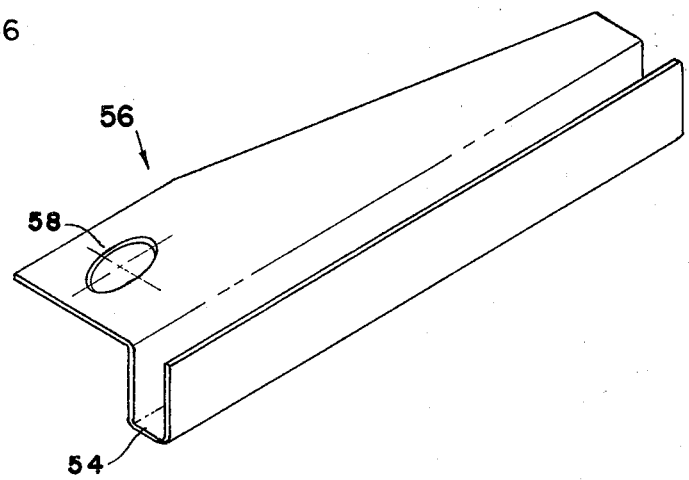
FIG. 7 is a perspective view of one of the brackets of the present invention.

To further secure the respective edges, and to give added support to the cab, a bracket structure 56 is provided at the corners of bonded edges AB and AC. The brackets are placed on the top of the wall sections 44, 45 and into molding 46 (FIG. 8) to give added support to transparent members 48, 49 and 50. As shown in FIGS. 7 and 8, these brackets have a U-shaped portion 54, the lower portion of which fits inside the top portion of the molding and which is further adapted to receive the lower portions of the respective transparent members. The ends of the bracket overlap and contain a hole 58, which when properly aligned in the corners of the cab coincides with each other, as shown in FIGS. 5 and 6. When the brackets are in their proper position a securing bolt 60 can be inserted therein, thereby securing the brackets in a relative position to each other. The securing of the bracket in relative position to each other maintains the abutting edges (A, B and C) of transparent members 48, 49 and 50 in proper position with each other. After the brackets have been properly positioned, as described above, the lower ends of the respective transparent members are inserted into the U-shaped portion of the brackets which are secured to the respective wall sections in the immediate vicinity of the corners of bonded edges AB and AC. The lower portions of the respective transparent members are maintained in their proper position by placing an adhesive of the type manufactured by the Loctite Corporation under the brand name of MI-NUTE-BOND, into the U-shaped portion of the brackets prior to the insertion of the transparent members therein.

The roof 62 of the cab is similar to the floor in that the roof contains section 44 and 45 which extend downwardly from the roof. Placed on the ends of these sections, at the corners of bonded edges AB and AC, are supporting brackets 56. These brackets are identical to the floor mounted brackets except they are associated with the roof rather than the floor as shown in FIG. 5.

Once the brackets are placed in their proper positions and the roof sections placed on the top portion of members 48, 49 and 50 another supporting means 67 is secured to both the foor and roof sections to further aid in supporting the transparent members in juxtaposition to each other.

Figure 3:
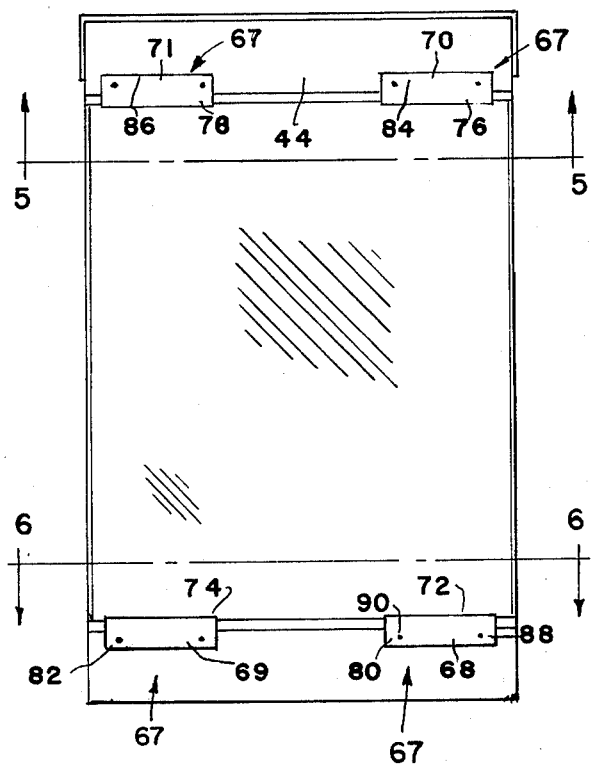
FIG. 3 is an elevational view of the front of the cab.

This supporting means consists of bars 68, 69, 70, 71 placed so as to contact the outward surface of transparent members 48. These bars, shown in FIG. 3, have portions 72, 74, 76 and 78, which contact transparent members 48 to maintain this member in contact with side members 49 and 50. These bars also contain portions 80, 82, 84, 86 which are secured to the wall sections of either the roof or floor of the cab. The securing portions of these bar contain holes 88 and 90 into which bolt 92 can pass. Once the bolt is positioned through the wall sections, a securing nut 93 is placed on the bolt to secure the bars in their proper position.

Figure 2:
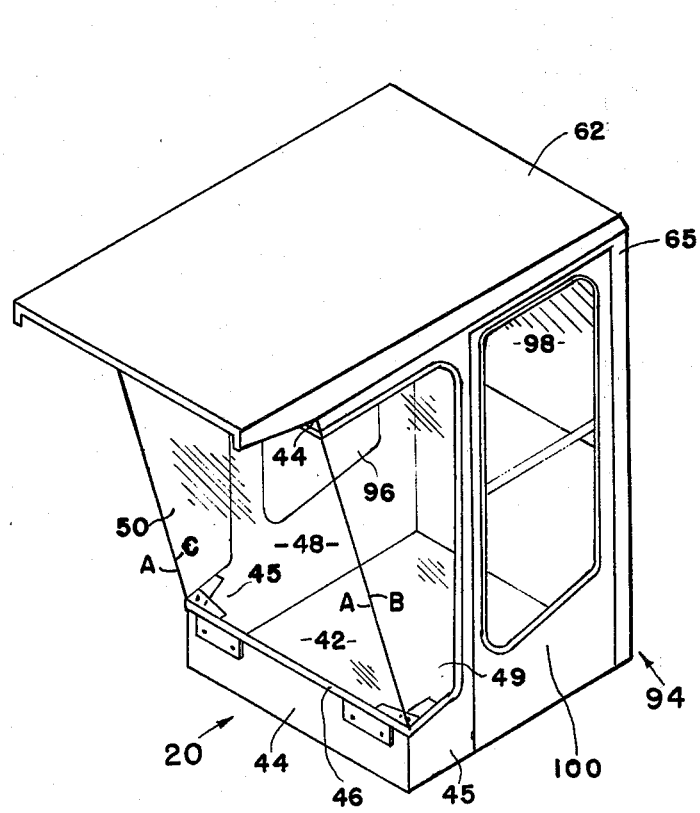
FIG. 2 is a perspective view of the left side of the cab.

The remaining portion of the cab contains frame 94 which includes generally vertical wall structure which extends between and rigidly interconnects the floor 42 and the roof 62 at locations along respective opposite sides of the cab being spaced rearwardly from the front thereof. This frame is provided with openings around which a molding idential to that previously described is placed. These openings are then fitted with various transparent members 96, 98 and door 100 as shown in FIG. 2.

Figure 4:
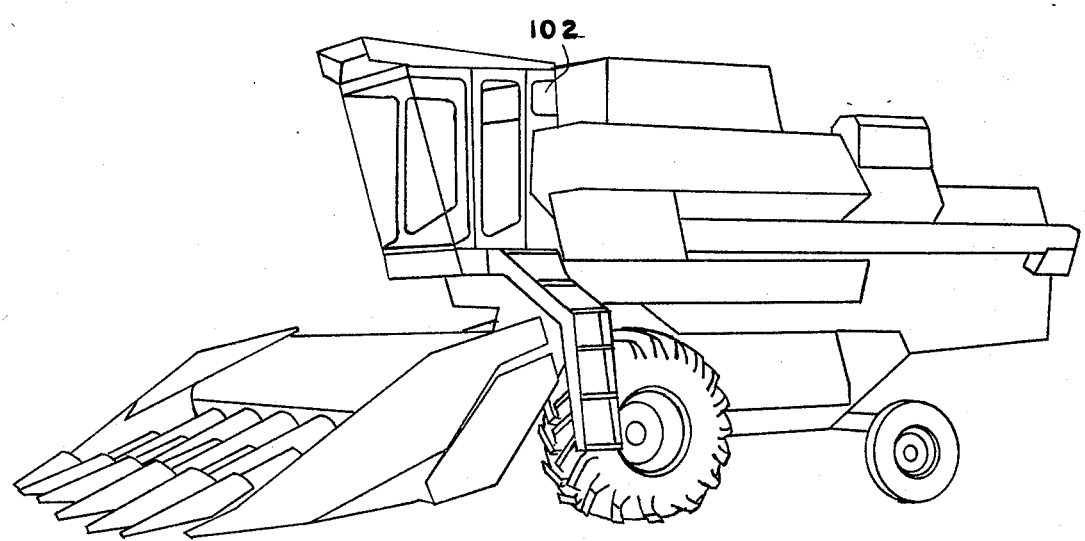
FIG. 4 is a perspective view of another embodiment of the cab for a harvesting machine.

The harvesting machine (combine) set out in FIG. 4 is directed to another embodiment of the present invention. The only variation from the structure previously described is the use of a narrower rear transparent member 102, which wraps around the sides of the cab rather than the large transparent member 98 used with the cab, shown in FIG. 2.

While the preferred structure in which the principles of the present invention have been incorporated is shown and described above, it is to be understood that the invention is not to be limited to the particular details, shown and described above, but that, in fact, widely different means may be employed in the practice of the broader aspects of this invention.

Having thus described the invention, what is claimed is:

1. In a cab for a harvesting machine, the combination comprising:
   A. a floor portion;
   B. a roof portion spaced above said floor portion;
   C. molding material fitted both on said floor and roof portions;
   D. transparent members mounted at their lower ends to said molding material on said floor portion and extending upwardly therefrom, and mounted at their upper ends to said molding material on said roof portion, the members being affixed to each other at their adjacent upwardly-extending edges in such a way as to eliminate any obstruction to vision through corners formed by said respective edges;
   E. a bracket fitted about each upper and lower end of each of said corners formed by said respective edges of said members for supporting said members in juxtaposition to each other without interfering with the view through said members, each of said brackets seated within the portion of said molding material adjacent the one of said upper and lower ends of said corners about which said bracket is fitted and thereby seated between said molding material portion and such one of said upper and lower ends of said corners.

2. A cab for a harvesting machine as set forth in claim 1, wherein said transparent members include a first transparent member mounted between forward sides of said floor and roof portions, and second and third transparent members mounted respectively on opposite lateral sides of said first member between opposite lateral sides of said floor and roof portions, respective forward edges of said second and third members abutting opposite lateral edges of said first member to form said respective corners therewith.

3. A cab for a harvesting machine as set forth in claim 2, the combination further comprising:
   at least one bar mounted to said forward side of said floor portion and mounted to said forward side of said roof portion, said bars being rigidly secured to respective surface portions of said first member adjacent said forward side of said floor and roof portions.

4. A cab for a harvesting machine, comprising:
   A. a floor;
   B. a roof;
   C. generally vertical wall structures extending between and rigidly interconnecting said floor and roof at locations along respective opposite side portions of said floor and roof being spaced rearwardly from respective front portions thereof;

D. lower structure fixed on the top of said floor, said lower structure extending across the front portion of said floor and therefrom rearwardly along the opposite side portions thereof to said vertical wall structures;

E. upper structure fixed to the bottom of said roof, said upper structure being spaced above said lower structure and extending across the front portion of said roof and therefrom rearwardly along the opposite side portions thereof to said vertical wall structures, said upper and lower structures defining an opening in said cab extending across the front thereof and therefrom rearwardly along the opposite sides of said cab to said vertical wall structures;

F. molding material fitted along an upper edge of said lower structure and along a lower edge of said upper structure;

G. a first transparent member mounted on said molding material of said lower and upper spaced apart structures and extending therebetween so as to enclose a front portion of said opening defined by said lower and upper structures across the front of said cab;

H. second and third transparent members mounted on said molding material of said lower and upper spaced apart structures and extending therebetween so as to enclose respective opposite side portions of said opening defined by said lower and upper structures and said vertical wall structures along the opposite sides of said cab, a forward edge of each of said second and third transparent members abutting, affixed to, and forming a corner with, one of the opposite side edges of said first transparent member in such a way as to eliminate any obstruction to vision through said corners formed by said respective transparent members; and I. bracket means fitted within said molding material of said upper structure and securing together an upper portion of said corners formed between said first transparent member and said respective second and third transparent members and fitted within said molding material of said lower structure and securing together a lower portion of said corners formed between said first transparent member and said respective second and third transparent members.

5. A cab for a harvesting machine as set forth in claim 4, the combination further comprising:

at least one bar mounted to a front portion of said lower structure adjacent the front portion of said floor and mounted to a front portion of said upper structure adjacent the front portion of said roof, said bars being rigidly secured to respective surface portions of said first member adjacent said respective front portions of said lower and upper structures.

* * * * *